United States Patent [19]

Minakawa et al.

[11] Patent Number: 5,276,499
[45] Date of Patent: Jan. 4, 1994

[54] SPECTROPHOTOMETER

[75] Inventors: Sadao Minakawa, Mito; Masaru Enomoto, Katsuta; Masaya Kojima, Mito, all of Japan

[73] Assignees: Hitachi, Ltd.; Hitachi Instrument Engineering Co., Ltd., both of Tokyo, Japan

[21] Appl. No.: 591,936

[22] Filed: Oct. 2, 1990

[30] Foreign Application Priority Data

Oct. 4, 1989 [JP] Japan .................. 1-257689

[51] Int. Cl.⁵ .............................. G01J 3/28; G01J 3/32
[52] U.S. Cl. ...................................... 356/319; 356/328
[58] Field of Search ........ 356/319, 326, 328, 333–334; 356/323, 325

[56] References Cited

U.S. PATENT DOCUMENTS

| | | | |
|---|---|---|---|
| 3,390,604 | 7/1968 | Makabe | 356/328 |
| 3,973,849 | 8/1976 | Jackson et al. | |
| 3,977,786 | 8/1976 | Gast | 356/319 |
| 4,180,327 | 12/1979 | Maeda et al. | |
| 4,323,309 | 4/1982 | Akitomo et al. | |
| 4,715,712 | 12/1987 | Nogami | 356/328 |
| 4,820,046 | 4/1989 | Sohma et al. | 356/328 |

FOREIGN PATENT DOCUMENTS

| | | |
|---|---|---|
| 3007793 | 9/1980 | Fed. Rep. of Germany . |
| 2747387 | 5/1987 | Fed. Rep. of Germany . |
| 5237796 | 9/1977 | Japan . |
| 6239299 | 10/1987 | Japan . |

Primary Examiner—Vincent P. McGraw
Assistant Examiner—K. P. Hantis
Attorney, Agent, or Firm—Antonelli, Terry, Stout & Kraus

[57] ABSTRACT

A spectrophotometer which takes out monochromatic lights from lights from light sources by using spectroscopes and transmits the monochromatic lights through a sample and detects the transmitted lights by sensors includes a plurality of dispersing elements in the spectroscope which bear the dispersion of different wavelength ranges or a plurality of sensors which bear the detection of different wavelength ranges in order to widen a measurement wavelength range; and means for correcting the difference between measured values obtained when the different dispersing elements were used or the difference between measured values obtained when the different sensors were used at one wavelength in overlap wavelength regions between different wavelength ranges so as to be set to zero.

7 Claims, 4 Drawing Sheets

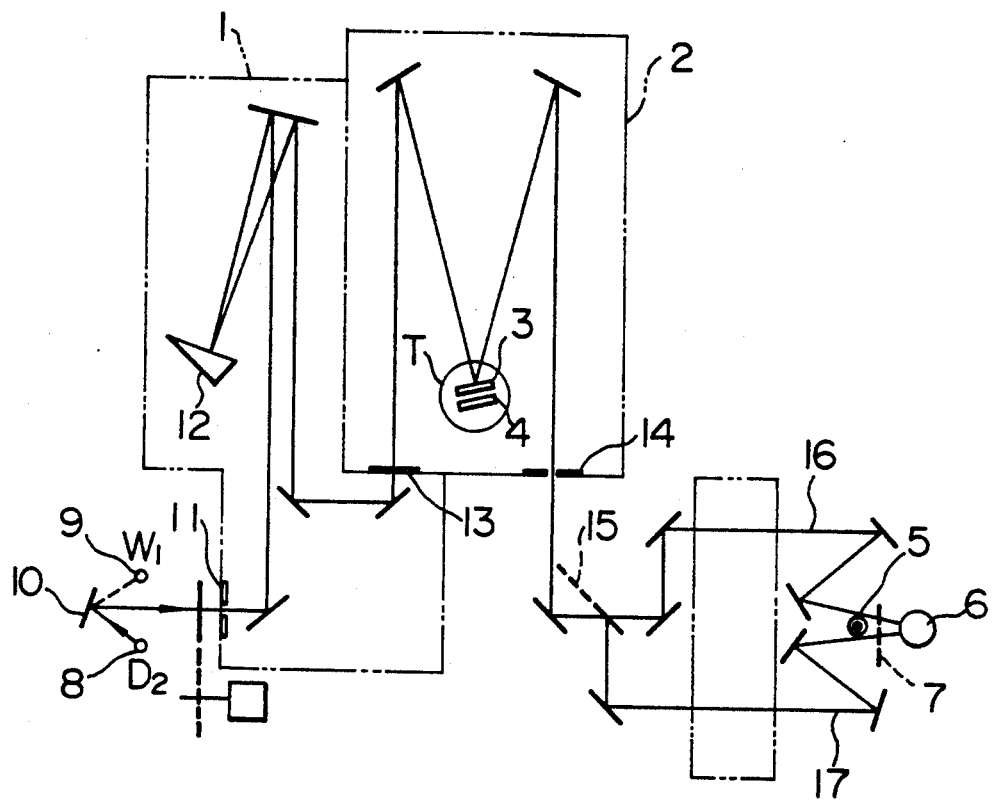
F I G. 1
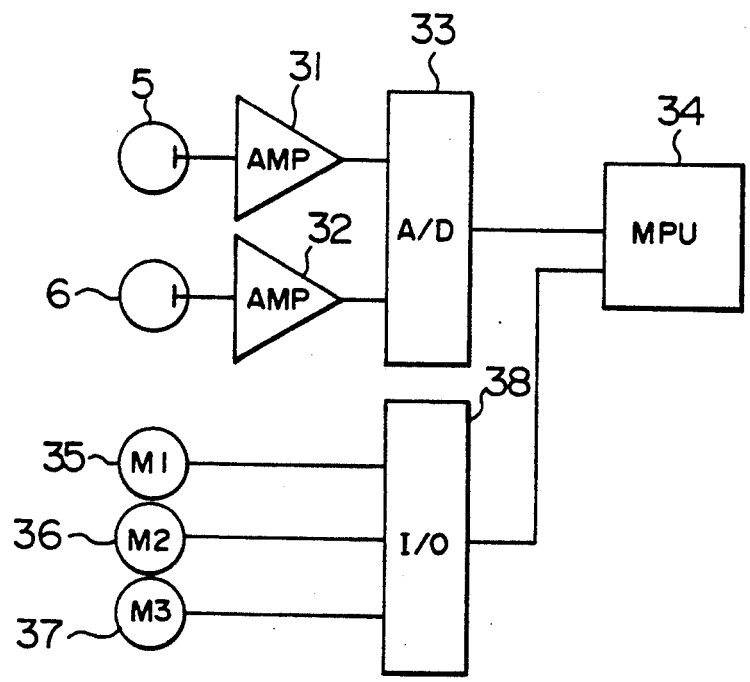
F I G. 2

DETERMINATION OF CORRECTION RANGE

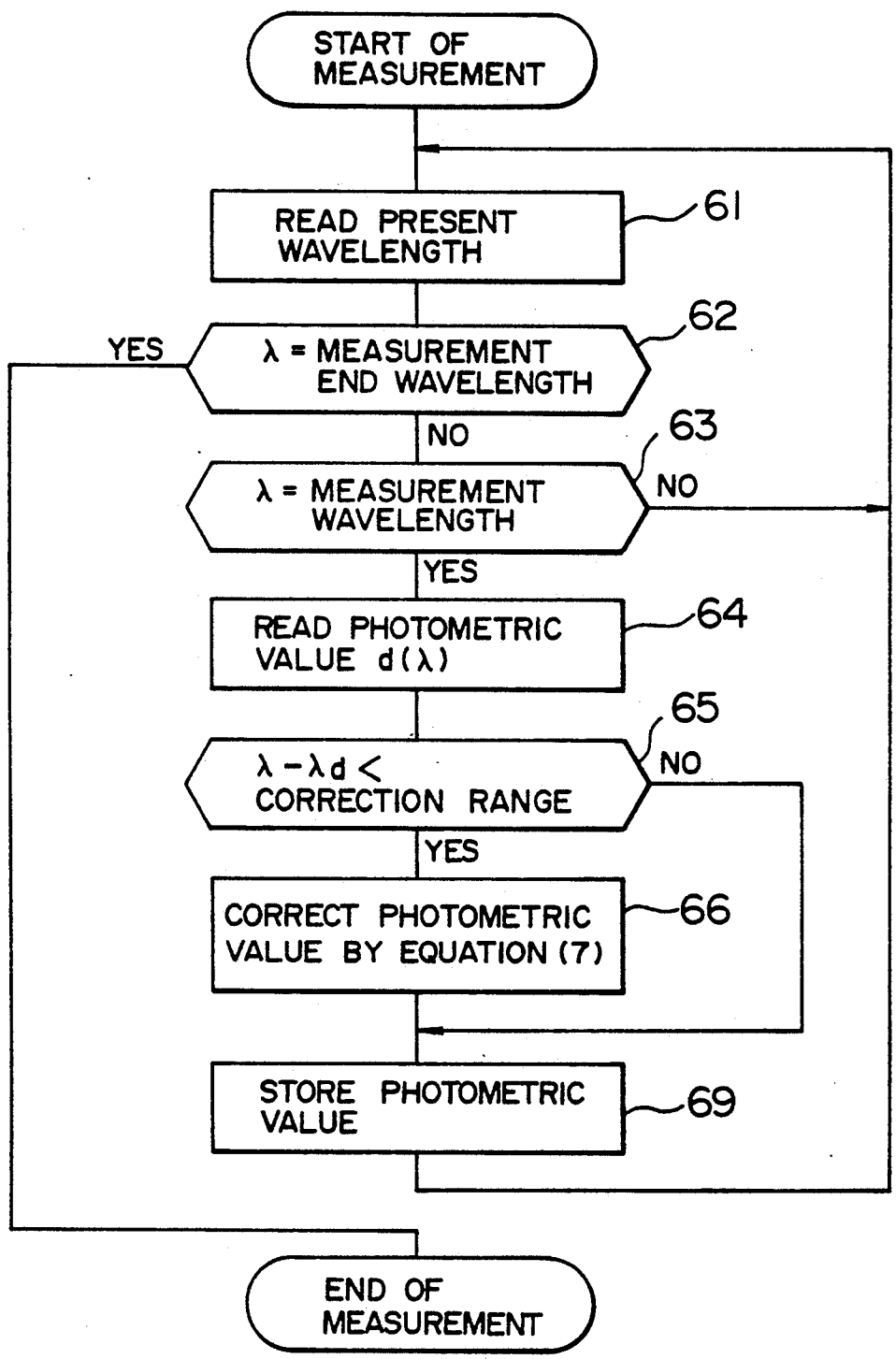

ly converted by the sensors. An electric signal corresponding to an amount of light which has passed through the standard side optical path is R. An electric signal corresponding to an amount of light which has passed through the sample side optical path is S. A ratio (S/R) between the electric signals R and S is taken out as a result of the measurement. A correction amount such as to always keep the ratio (S/R) constant is calculated. The calculated correction value is stored into a memory in a computer. After that, when a sample is actually set on the sample side optical path and measured, the correction value stored in the memory is read out and the measured value is corrected by the correction value.

SPECTROPHOTOMETER

BACKGROUND OF THE INVENTION

The present invention relates to a spectrophotometer and, more particularly, to a spectrophotometer using a plurality of sensors, dispersing elements having different optical characteristics, or a combination thereof.

The spectrophotometer has a spectroscope for dispersing a light from a light source and taking out a monochromatic light and branches the monochromatic light from the spectroscope into two light fluxes by a branch mirror. One of the two light fluxes is led to a standard side optical path and the other is led to a sample side optical path. The branched monochromatic lights pass through the standard side optical path and the sample side optical path which are held in an air state in which a substance to be measured is not yet set, respectively, and enter the sensors and are photoelectrically converted by the sensors. An electric signal corresponding to an amount of light which has passed through the standard side optical path is R. An electric signal corresponding to an amount of light which has passed through the sample side optical path is S. A ratio (S/R) between the electric signals R and S is taken out as a result of the measurement. A correction amount such as to always keep the ratio (S/R) constant is calculated. The calculated correction value is stored into a memory in a computer. After that, when a sample is actually set on the sample side optical path and measured, the correction value stored in the memory is read out and the measured value is corrected by the correction value.

The above method is a conventional base line correcting method, in which measurements are performed in the air state with respect to both of the standard side and the sample side and the difference between the results of the measurements is corrected as a difference when a sample is actually measured.

In the case of executing measurements for a whole wavelength range to be measured by using one sensor and one dispersing element, no problem occurs when using the above base line correcting method. However, in the case where a highly accurate measurement is required for a wide wavelength range or the like, it is necessary to use a plurality of sensors or dispersing elements which bear measurements of different wavelength ranges. However, sensitivity characteristics and spectrum characteristics of the sensors or dispersing elements which bear the different wavelength ranges are different. Particularly, the sensitivity characteristics or dispersing characteristics of two sensors or dispersing elements remarkably deteriorate in the overlap wavelength regions between adjacent wavelength ranges. Therefore, an unreproducible difference easily occurs in the measured values in such overlap wavelength regions.

As apparatuses regarding such a kind of apparatus, there have been disclosed apparatuses in, for instance, JP-U-62-39299, Japanese Patent Serial No. 968560, and the like.

According to the above conventional base line correcting method, a difference between R and S is detected and the difference amount is merely corrected upon actual measurement of a sample in a manner such that the ratio (S/R) of the energy S which passes through the sample side optical path to the energy R which passes through the standard side optical path becomes constant. Consequently, consideration lacks with respect to the following points.

1. No consideration is paid to a point that the sensitivity characteristics of two kinds of sensors are very low in the overlap wavelength regions and a point that the detection signals suddenly decrease in a very weak direction.

2. No consideration is paid to a point that although measurements to determine the correction amount are executed in a manner of air-to-air with regard to both of the standard side and the sample side, in the case of actually setting a sample and measuring the sample, situations in which the light after passing through the sample enters the photosensitive surfaces of the sensors are different due to influences by a refractive index, a reflectance, and a deflecting characteristic of the sample depending on the shape and material of the sample.

In both of the above two cases (1) and (2), the results of the measurements which were obtained in the case where both of the standard side optical path and the sample side optical path were held in the air state are used as references. Thus, there is a problem such that a difference occurs between the result obtained by the actual measurement of the sample and the correction amount.

SUMMARY OF THE INVENTION

It is an object of the present invention to provide a spectrophotometer which covers a whole measurement wavelength range by using a plurality of sensors or dispersing elements.

Another object of the invention is to provide a spectrophotometer which corrects the measured value so as to obtain the same measurement data in overlap wavelength regions of sensor or dispersing elements which bear different wavelength ranges.

Still another object of the invention is to provide a spectrophotometer which can obtain smooth optical characteristics in both of overlap wavelength regions of sensors or dispersing elements which bear different wavelength ranges and wavelength regions near the overlap wavelength regions.

According to the invention, there is provided a spectrophotometer which determines a correction amount for each wavelength on the basis of the results obtained by actually measuring a number of samples and corrects the measured data in the overlap wavelength regions of different sensors or dispersing elements and in the wavelength regions near the overlap wavelength regions by the correction amounts.

According to the invention, since the correction amounts are calculated on the basis of the results of the actual measurements of the samples, it is possible to correct the difference between the measured values which occurs due to different spectrum sensitivities of two kinds of sensors or due to the different dispersing capabilities of the dispersing elements and to also correct the difference between the measured values which occurs depending on the shapes and materials of the samples.

BRIEF DESCRIPTION OF THE DRAWINGS

FIG. 1 is a system diagram of an optical system showing an embodiment of the invention;

FIG. 2 is a block circuit diagram showing a processing system of detection signals in the embodiment of FIG. 1 and its control system;

FIGS. 5 and 6 are flowcharts showing operation procedures of the invention.

DESCRIPTION OF THE PREFERRED EMBODIMENTS

Figure 3:
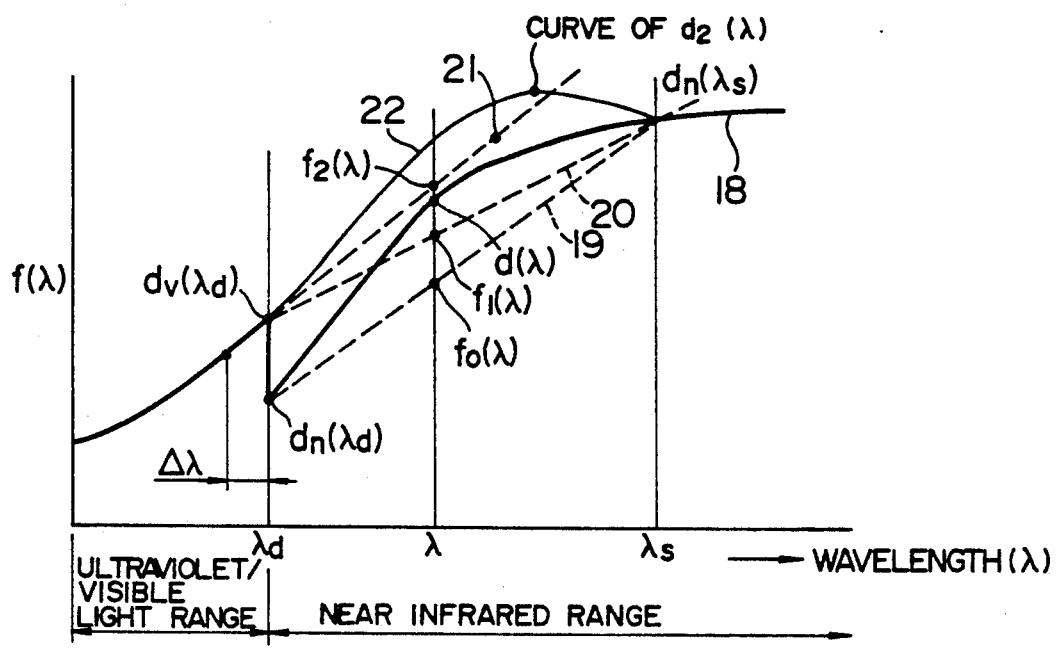
FIG. 3 is a diagram for explaining the principle of the invention.

FIG. 1 is a system diagram of an optical system of a spectrophotometer which embodies the present invention. A spectroscope in the spectrophotometer is of the double monochromator type which is constructed by serially coupling two spectroscopes 1 and 2. A prism 12 having a vertical angle of 30° and made of quartz is used as a dispersing element of the spectroscope 1. Two diffraction gratings 3 and 4 are used as dispersing elements of the spectroscope 2. The diffraction gratings 3 and 4 are put on a rotary table T and can be switched by rotating the rotary table T by 180°. A sensor section includes a lead sulfide sensor (hereinafter, referred to as a PbS sensor) 5 for use in a near infrared range; a photomultiplier 6 for use in an ultraviolet/visible light range; and a switching mirror 7 for selectively switching and using either one of those sensors. The switching mirror 7 can be set to of a first position for enabling light fluxes 16 and 17 to proceed straight so as to enter the sensor 6 and a second position for reflecting the light fluxes 16 and 17 so as to enter the sensor 5. The switching mirror 7 is switched between the first and second positions by driving means such as a motor or the like.

The above operations will now be described. First a white light from a light source 8 or 9 is converged to a first slit 11 by a converging mirror 10. The incident light is dispersed by a dispersing element 12 of the spectroscope 1 and becomes a monochromatic light by an incident slit 13 which functions as an exit for the spectroscope 1 and as an entrance for the spectroscope 2. The monochromatic light is irradiated to the diffraction grating 3 or 4 of the spectroscope 2. The irradiated monochromatic light is dispersed by the diffraction grating 3 or 4 and is taken out of an outgoing slit 14 as a monochromatic light of a further high purity and is alternately branched into the two light fluxes 16 and 17 by a rotary mirror 15. Each of the branched light fluxes enters the sensor 5 or 6. The incident monochromatic light is photoelectrically converted. The resultant electric signals are transmitted through amplifiers 31 and 32 and an A/D converter 33 and are input to a computer (MPU) 34 as shown in FIG. 2. The signals are data processed by the MPU 34, so that characteristic curves of a wavelength versus a light intensity, that is, spectrum curves, are obtained. A motor 35 to wavelength scan the prism 12 and the diffraction gratings 3 and 4 interlockingly, a motor 36 for rotating the rotary table T by 180° and switching the diffraction gratings, and a motor 37 to drive the switching mirror 7 are controlled by the computer 34 through an input/output apparatus 38.

The two diffraction gratings 3 and 4 and the sensors 5 and 6 are used to extend a measurable wavelength range which is required for the spectrophotometer. For instance, a wavelength range of a good spectrum efficiency of the diffraction grating 3 and a wavelength range having a desired sensitivity of the sensor 6 lie within a range from 187 to 900 nm. To assure the measurement in a long wavelength range which exceeds such a range, it is necessary that the motors 36 and 37 are driven to switch to the side of the diffraction grating 4 and sensor 5 and the apparatus is used within its effective wavelength range. In the case of switching and using the different kinds of diffraction gratings or sensors, a large level difference occurs between the measured spectrum curves as shown in FIG. 3. The invention intends to automatically correct such a large level difference.

Figure 4:
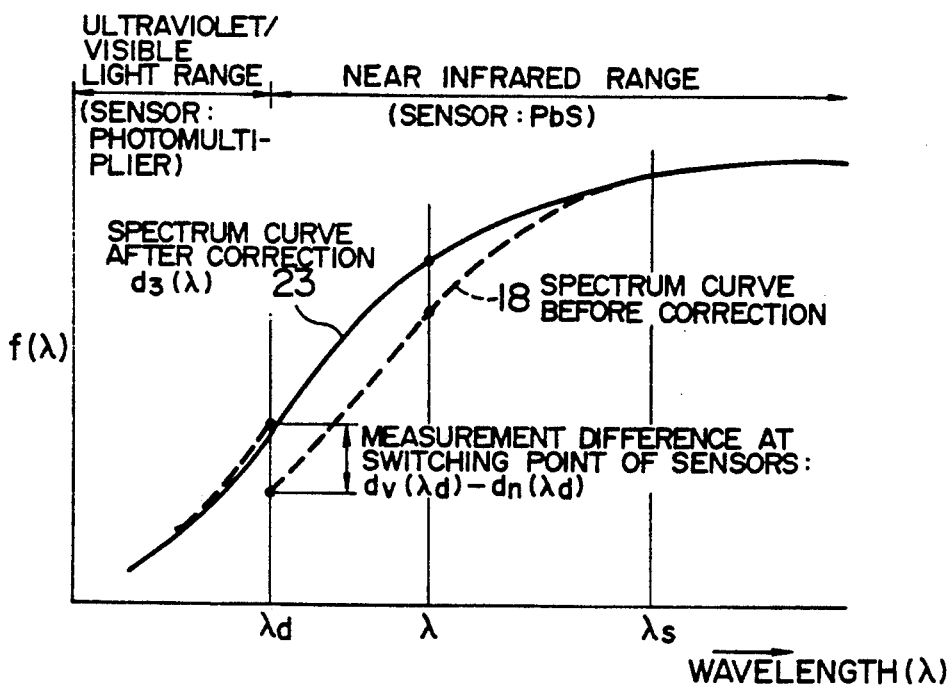
FIG. 4 is a diagram showing a comparison result of spectrum characteristic curves before and after the execution of the invention.

The principle of the invention will now be described hereinbelow with reference to FIGS. 3 and 4.

In FIG. 3, a solid line 18 denotes a spectrum curve which was actually measured. The sensors in FIG. 1 are switched from 5 to 6 at a switching wavelength point $\lambda_d$ just between the near infrared range and the ultraviolet/visible light range. The diffraction gratings as dispersing elements in FIG. 1 are also switched from 3 to 4. Since the sensors having different spectrum sensitivity characteristics and the dispersing elements having different dispersing capabilities are switched at the switching wavelength point $\lambda_d$, the measured values in the near infrared range and the ultraviolet/visible light range at the switching wavelength point $\lambda_d$ are $d_n(\lambda_d)$ and $d_v(\lambda_d)$ and are different as shown by the solid line 18 in FIG. 3.

In the invention, the measured value is corrected so that the difference between the photometric values at the switching wavelength point $\lambda_d$, that is, $d_v(\lambda_d) - d_n(\lambda_d)$ is equal to 0.

An embodiment of the calculation will now be explained hereinbelow.

First, a wavelength $\lambda_s$ having stable spectrum characteristics and sensitivity characteristics which is nearest to the overlap wavelength region between different adjacent wavelength ranges is determined. An equation $f_0(\lambda)$ of a straight line 19 connecting the photometric value $d_n(\lambda_s)$ of the wavelength $\lambda_s$ and the photometric value $d_n(\lambda_d)$ of the wavelength $\lambda_d$ in the overlap wavelength region is as shown in the following equation.

$$f_0(\lambda) = \{(d_n(\lambda_s) - d_n(\lambda_d))/(\lambda_s - \lambda_d)\}(\lambda - \lambda_d) + d_n(\lambda_d) \quad (1)$$

Then, an equation $f_1(\lambda)$ of straight line 20 connecting the measured value $d_n(\lambda_s)$ of the wavelength $\lambda_s$ and the measured value $d_v(\lambda_d)$ of the wavelength $\lambda_d$ in the ultraviolet/visible light range is as shown in the following equation.

$$f_1(\lambda) = \{(d_n(\lambda_s) - d_v(\lambda_d))/(\lambda_s - \lambda_d)\}(\lambda - \lambda_d) + d_v(\lambda_d) \quad (2)$$

Further, an equation $f_2(\lambda)$ of a straight line 21 which extends from $d_v(\lambda_d)$ to the near infrared range at an inclination angle at the wavelength $\lambda_d$ of the curve 18 in the ultraviolet/visible light range is as shown in the following equation.

$$f_2(\lambda) = \{(\lambda_d) - d_v(\lambda_d - \Delta\lambda))/\Delta\lambda\}(\lambda - \lambda_d) + d_v(\lambda_d) \quad (3)$$

Correction data $d_1(\lambda)$ from which the level difference $(d_v(\lambda_d) - d_n(\lambda_d))$ between the measured values which occurs in the overlap wavelength region was merely eliminated is obtained by the following equation.

$$d_1(\lambda) = d(\lambda) + (f_1(\lambda) - f_0(\lambda)) \quad (4)$$

However, in this case, since refraction points occur at the points of the wavelengths $\lambda_d$ and $\lambda_s$, various simulations were executed to eliminate the refraction points.

Thus, it has been found that a smooth curve can be obtained by applying a fourth-order weight to the equation (4). The equation is as follows.

$$d_2(\lambda) = d(\lambda) + \{f_1(\lambda) - f_0(\lambda)\}\left(1 - \frac{\lambda - \lambda_d}{\lambda_s - \lambda_d}\right)^4 \quad (5)$$

By substituting the equations (1) and (2) into the equation (5), the following equation is derived.

$$d_2(\lambda) = d(\lambda) + (d_\nu(\lambda_d) - d_n(\lambda_d))\left(1 - \frac{\lambda - \lambda_d}{\lambda_s - \lambda_d}\right)^5 \quad (6)$$

The equation (6) will now be considered. For instance, assuming that the measurement wavelength $\lambda$ is set to $\lambda_d$, the fifth-order term in the parentheses is equal to 1. On the other hand, the first term $d(\lambda)$ of the right-hand side is equal to $d_n(\lambda_d)$, so that $d_2(\lambda)=d_\nu(\lambda_d)$. On the other hand, assuming that the measurement wavelength is set to $\lambda=\lambda_s$, the 5th-order term in the parenthese is equal to 0, so that $d_2(\lambda)=d_n(\lambda s)$. Both of the above values of $d_2(\lambda)$ are located on the straight line $f_1(\lambda)$. Moreover, the measured values between $\lambda_d$ and $\lambda_s$ are applied with the 5th-order wight and are multi-dimensionally corrected and a smooth correction curve having no bending point is derived like a curve 22.

However, in the approximate expression of the equation (6), a curve having a slightly convex tendency is obtained like a thin solid line 22 shown in FIG. 3 and an excessive correction occurs. To prevent it, correction is further performed by the following approximate expression.

$$d_3(\lambda) = d_2(\lambda) + (f_2(\lambda) - d_2(\lambda))\left(1 - \frac{\lambda - \lambda_d}{\lambda_s - \lambda_d}\right)^5 \quad (7)$$

In the equation (7), the 5th-order correction is executed with respect to the difference between the spectrum curve 22 after the correction which was obtained by the equation (6) and the straight line $f_2(\lambda)$ to thereby approach to the straight line $f_1(\lambda)$ and the correction was performed so as to obtain a smooth curve near the true value for a region from the ultraviolet/visible light range to the near infrared range. Thus, an ideal correction spectrum curve 23 as shown by a solid line in FIG. 4 can be obtained.

The application range of the equation (7) is effective in a range which satisfies the following conditions.

1. Limitation of a switching level difference $(f(\lambda))$ $$|d_\nu(\lambda_d) - d_n(\lambda_d)| \geq 0.2\% \ T$$

where, % T denotes a light transmission when it is assumed that a total light transmission amount is set to 100% T and a light blocking state is set to 0% T. If the level difference between the measured values of both of the sensors at the same wavelength $\lambda_d$ is equal to or less than 0.2% T, it can be regarded that such a state hardly has a different level. Therefore, in this case, such a state means that there is no need to execute any correction.

2. Limitation of a gradient in a range of $\Delta\lambda$ of the spectrum curve on the side of the ultraviolet/visible light range $$|\text{inclination between } d_\nu(\lambda_d) \text{ and } d_\nu(\Delta\lambda)| \geq 0.2\% \ T/\text{nm}$$

When the gradient is large, even if a correction range $(\lambda_s-\lambda_d)$ from $\lambda_d$ to $\lambda_s$ is narrowed, a smooth spectrum curve can be obtained. However, when the gradient is small, it is necessary to widen the correction range. However, when the gradient is equal to or less than 0.2 % T/nm, a large effect of the correction is not expected even if the correction range is fairly widened. Therefore, the correction range is limited to a predetermined range, for instance, 100 nm.

3. Correction limit wavelength in the near infrared range $$\lambda_s - \lambda_2 = 200/|\text{inclination between } d_\nu(\lambda_d) \text{ and } d_\nu(\Delta\lambda)| \geq = 100 \text{ nm}$$

In the above equation, a value of 200 was experimentally determined.

In the condition of the item (2), when the gradient is equal to or larger than 0.2% T/nm, a value obtained as a result by dividing 200 by the gradient value is set into the correction range $(\lambda_s-\lambda_d)$. However, if the correction range is larger than 100 nm, it is set to 100 nm.

Figure 5:
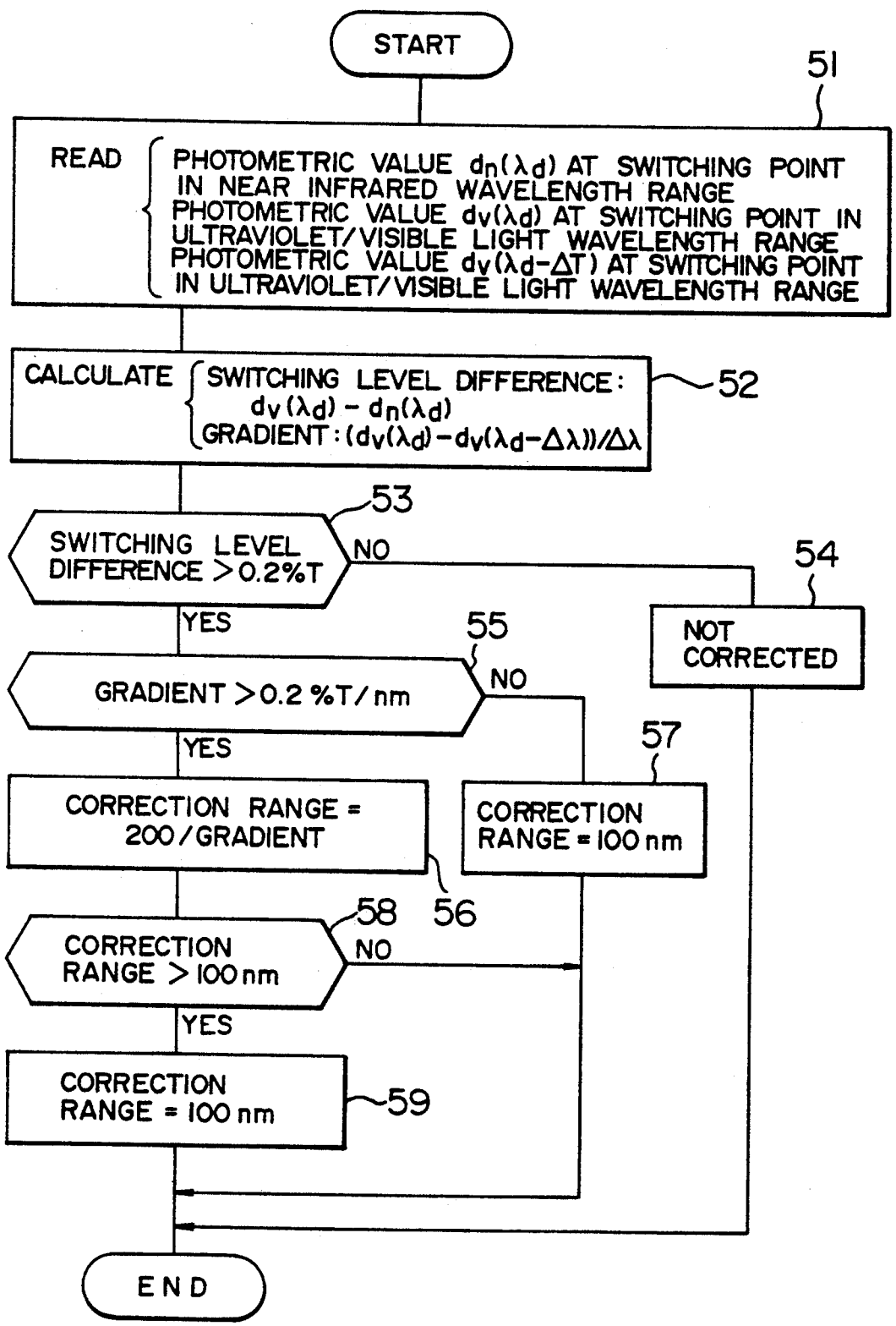

FIG. 5 shows a procedure to determine the correction range on the basis of the above three conditions. The procedure of FIG. 5 will be understood from the above description without further explanation in detail.

After completion of the above preparation, the actual measurements are executed in accordance with a procedure of FIG. 6. When the measurement is started, the present measurement wavelength $\lambda$ is first read in step 61. A check is made to see if the read wavelength is a measurement end wavelength or not in step 62. If the wavelength scan is still being executed, step 63 follows and a check is made to see if the read wavelength is a measurement wavelength or not. If NO, the wavelength scan is continued and the processing routine is returned to step 61. However, if YES in step 63, the photometric value $d(\lambda)$ is read in step 64 and the difference $(\lambda-\lambda_d)$ is calculated and a check is made to see if the calculated value is smaller than the correction range $(\lambda_s-\lambda_d)$ or not in step 65. If YES, the photometric value $d(\lambda)$ is corrected by the equation (7). The corrected value is stored into a memory in the MPU 34 in step 67. If it is determined in step 65 that $(\lambda-\lambda_d)$ is out of the correction range, the actual measured value is stored into the memory in step 67 without being corrected at all. The measurement is finished when the end of the wavelength scan was decided in step 62.

The case of switching the sensors 5 and 6 simultaneously with the switching of the dispersing elements 3 and 4 has been described above. However, the invention is not limited to such a case. For instance, it is also possible to construct in a manner such that only one dispersing element is used for the whole wavelength range and a plurality of sensors are switched and used in accordance with different wavelength ranges. On the contrary, it is also possible to use only one sensor for the whole wavelength range and to switch and use a plurality of dispersing elements for different wavelength ranges. Further, the dispersing elements and the sensors can be also switched at different wavelength points instead of the same wavelength point.

We claim:

1. A spectrophotometer comprising:

light source means for emitting light having a plurality of wavelengths;

spectroscope means for dispersing the light emitted by the light source means to produce monochromatic light having a wavelength within a range of wavelengths;

a plurality of sensors used one at a time for detecting the monochromatic light produced by the spectroscope means within a corresponding plurality of successive overlapping wavelength ranges within the range of wavelengths of the monochromatic light, and for outputting a corresponding plurality of output signals representing the detected monochromatic light; and correcting means for correcting at least one output signal of two output signals of two of the sensors corresponding to two adjacent wavelength ranges of the plurality of successive overlapping wavelength ranges to provide a smooth continuous spectrum characteristic between the two adjacent wavelength ranges, the smooth continuous spectrum characteristic connecting a value of a first output signal of the two output signals at a first wavelength within an overlap wavelength region between the two adjacent wavelength ranges to a value of a second output signal of the two output signals at a second wavelength in one of the two adjacent wavelength regions near the overlap wavelength region.

2. A spectrophotometer according to claim 1, wherein the correcting means includes means for determining a correction range in which the at least one output signal is corrected, the correction range extending from the first wavelength to the second wavelength.

3. A spectrophotometer according to claim 2, wherein the means for determining a correction range includes means for setting the correction range to a predetermined correction range when a gradient of the value of the first output signal at the first wavelength is not greater than a predetermined gradient.

4. A spectrophotometer according to claim 2, wherein the means for determining a correction range includes means for setting the correction range as a function of a gradient of the value of the first output signal at the first wavelength when the gradient is greater than a predetermined gradient.

5. A spectrophotometer according to claim 1, wherein the spectroscope means includes a plurality of dispersing elements used one at a time for dispersing the light emitted by the light source means to produce monochromatic light having a wavelength within a corresponding plurality of different wavelength ranges;

wherein the first output signal represents detected monochromatic light produced by a first dispersing element of the plurality of dispersing elements, and the second output signal represents detected monochromatic light produced by a second dispersing element of the plurality of dispersing elements; and wherein the correcting means corrects the at least one output signal to correct for a difference between the value of the first output signal and the value of the second output signal due to a difference between a dispersing characteristic of the first dispersing element and a dispersing characteristic of the second dispersing element.

6. A spectrophotometer comprising:

light source means for emitting light having a plurality of wavelengths;

spectroscope means for dispersing the light emitted by the light source means to produce monochromatic light having a wavelength within a range of wavelengths;

a plurality of sensors used one at a time for detecting the monochromatic light produced by the spectroscope means within a corresponding plurality of successive overlapping wavelength ranges within the range of wavelengths of the monochromatic light, and for outputting a corresponding plurality of output signals representing the detected monochromatic light;

correcting means for correcting at least one output signal of two output signals of two of the sensors corresponding to two adjacent wavelength ranges of the plurality of successive overlapping wavelength ranges such that a value of a first one of the two output signals at a selected wavelength within an overlap wavelength region between the two adjacent wavelength ranges is equal to a value of a second output signal of the two output signals at the selected wavelength;

means for detecting a difference between the values of the first and second output signals; and means for preventing the correcting means from correcting the at least one output signal when the detected difference is not greater than a predetermined difference.

7. A spectrophotometer comprising:

light source means for emitting light having a plurality of wavelengths;

spectroscope means for dispersing the light emitted by the light source means to produce monochromatic light having a wavelength within a range of wavelengths, the spectroscope means including a plurality of dispersing elements used one at time for dispersing the light emitted by the light source means to produce monochromatic light having a wavelength within a corresponding plurality of different wavelength ranges;

a sensor for detecting the monochromatic light produced by the spectroscope means and for outputting an output signal representing the detected monochromatic light; and correcting means for correcting at least one of a first output signal of the sensor representing monochromatic light produced by a first dispersing element of the plurality of dispersing elements and a second output signal of the sensor representing monochromatic light produced by a second dispersing element of the plurality of dispersing elements to provide a smooth continuous spectrum characteristic between two adjacent wavelength ranges corresponding to the first and second dispersing elements, the smooth continuous spectrum characteristic connecting a value of the first output signal at a first wavelength within an overlap wavelength region between the two adjacent wavelength ranges to a value of the second output signal at a second wavelength in one of the two adjacent wavelength regions near the overlap wavelength region.

* * * * *